United States Patent
Funatsu et al.

(10) Patent No.: US 10,364,381 B2
(45) Date of Patent: Jul. 30, 2019

(54) RELEASE FILM

(71) Applicant: MITSUBISHI CHEMICAL CORPORATION, Tokyo (JP)

(72) Inventors: Ryosuke Funatsu, Maibara (JP); Taishi Kawasaki, Maibara (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/744,282

(22) PCT Filed: Feb. 25, 2016

(86) PCT No.: PCT/JP2016/055620
§ 371 (c)(1),
(2) Date: Jan. 12, 2018

(87) PCT Pub. No.: WO2017/013891
PCT Pub. Date: Jan. 26, 2017

(65) Prior Publication Data
US 2018/0208811 A1    Jul. 26, 2018

(30) Foreign Application Priority Data
Jul. 18, 2015   (JP) ................ 2015-143519

(51) Int. Cl.
| | | |
|---|---|---|
| *C09J 167/02* | (2006.01) | |
| *B32B 27/00* | (2006.01) | |
| *B32B 27/36* | (2006.01) | |
| *C08J 7/04* | (2006.01) | |
| *C09J 183/04* | (2006.01) | |
| *C09J 7/40* | (2018.01) | |
| *C09D 183/04* | (2006.01) | |
| *C08G 63/183* | (2006.01) | |
| *C08G 77/12* | (2006.01) | |
| *C08G 77/20* | (2006.01) | |

(52) U.S. Cl.
CPC ............. *C09J 167/02* (2013.01); *B32B 27/00* (2013.01); *B32B 27/36* (2013.01); *C08J 7/04* (2013.01); *C08J 7/047* (2013.01); *C09D 183/04* (2013.01); *C09J 7/401* (2018.01); *C09J 183/04* (2013.01); *C08G 63/183* (2013.01); *C08G 77/12* (2013.01); *C08G 77/20* (2013.01); *C08J 2367/02* (2013.01); *C08J 2483/04* (2013.01); *C09J 2467/005* (2013.01); *C09J 2467/006* (2013.01); *C09J 2483/003* (2013.01); *C09J 2483/005* (2013.01)

(58) Field of Classification Search
CPC .................................................... C09J 167/02
See application file for complete search history.

(56) References Cited

U.S. PATENT DOCUMENTS

| | | | |
|---|---|---|---|
| 6,656,598 B2 | 12/2003 | Kudo et al. | |
| 2011/0151167 A1* | 6/2011 | Okumura | B32B 7/06 |
| | | | 428/40.6 |

FOREIGN PATENT DOCUMENTS

| | | |
|---|---|---|
| JP | 8-53652 | 2/1996 |
| JP | 8-118573 | 5/1996 |
| JP | 10-330683 | 12/1998 |
| JP | 10330683 A * | 12/1998 |
| JP | 2002-121483 | 4/2002 |
| JP | 2003-49394 | 2/2003 |
| JP | 2003-192987 | 7/2003 |
| JP | 2006-7689 | 1/2006 |
| JP | 2006-95710 | 4/2006 |
| JP | 2006-307148 | 11/2006 |
| JP | 2007-31584 | 2/2007 |
| JP | 2008-6804 | 1/2008 |
| WO | WO 2015/006801 | 1/2015 |

OTHER PUBLICATIONS

International Search Report for PCT/JP2016/055620, dated May 24, 2016, 4 pages.
International Preliminary Report on Patentability issued in PCT/JP2016/055620 dated Jan. 23, 2018.
Search Report issued in EP Appln. No. 16827457.9 dated Oct. 16, 2018.
Office Action issued in KR Appln. No. 10-2018-7000369 dated Jan. 29, 2019 (translation only).

\* cited by examiner

*Primary Examiner* — Daniel H Lee
(74) *Attorney, Agent, or Firm* — Nixon & Vanderhye P.C.

(57) ABSTRACT

According to the present invention, there is provided a release film that can be suitably used in various applications without suffering from deterioration in releasing property thereof, for example, owing to a solvent used upon processing an adhesive layer, when the film is used as a release film for adhesives or a protective film for an adhesive layer for a polarizing plate. The release film of the present invention comprises a polyester film and a coating layer formed on at least one surface of the polyester film, the coating layer comprising a silicone compound and a Gemini surfactant.

12 Claims, No Drawings

RELEASE FILM

This application is the U.S. national phase of International Application No. PCT/JP2016/055620 filed 25 Feb. 2016, which designated the U.S. and claims priority to JP Patent Application No. 2015-143519 filed 18 Jul. 2015, the entire contents of each of which are hereby incorporated by reference.

TECHNICAL FIELD

The present invention relates to a release film, and more particularly, to a release film that can be suitably used, for example, as a release film for adhesives, a protective film for an adhesive layer of a polarizing plate, a release film used in a process for production of a ceramic capacitor, etc.

BACKGROUND ART

Hitherto, polyester films typically such as polyethylene terephthalate films or polyethylene naphthalate films have been extensively used in various applications because of excellent properties such as mechanical strength, dimensional stability, flatness, heat resistance, chemical resistance and optical properties as well as excellent cost performance.

As one of the applications using the polyester films, there may be mentioned a release film for adhesives, a protective film for an adhesive layer of a polarizing plate or a release film used in a process for production of a ceramic capacitor. For example, in the case where the polyester film is used for adhesive products, an adhesive is dissolved or dispersed in various solvents, and the resulting solution or dispersion is applied onto a release film and then heated to remove the solvent therefrom and subject the adhesive to crosslinking reaction, thereby forming an adhesive layer on the release film. Thereafter, the release film is peeled off to allow the adhesive layer to exhibit its adhesion performance.

When using the polyester film in these applications, it is required that the polyester film has releasing property against an adhesive, etc. To this end, many methods for providing a release layer constituted of a silicone composition such as typically polydimethylsiloxane on the polyester film have been proposed (for example, Patent Literature 1). However, in these methods, an organic solvent is frequently used as a solvent for a coating agent that is used for forming the release layer, so that there tends to occur such a problem that a large-size facility is required for treating the organic solvent upon coating or drying. In addition, the methods also have such a problem that working environments as well as safety against explosion or fire accident owing to the organic solvent must be taken into consideration. On the other hand, solvent-free methods using no organic solvent have also been proposed (Patent Literature 2). In the solvent-free methods, there tends to occur such a problem that the viscosity of a coating solution is increased, so that it may be difficult to obtain a uniform coating film.

From these viewpoints, coating methods using an aqueous silicone emulsion have also been proposed (Patent Literature 3). However, in this case, there tends to occur such a problem that a stable uniform coating film is hardly formed from the emulsion owing to poor stability of the emulsion, and the resulting film is deteriorated in solvent resistance. When used in adhesive products, a coating layer is brought into contact with a solvent, and it is therefore important that the coating layer has good solvent resistance. For this reason, it has been demanded to provide a release film including a coating layer that has excellent solvent resistance.

CITATION LIST

Patent Literature

Patent Literature 1: Japanese Patent Application Laid-Open (KOKAI) No. 2006-7689
Patent Literature 2: Japanese Patent Application Laid-Open (KOKAI) No. 2003-192987
Patent Literature 3: Japanese Patent Application Laid-Open (KOKAI) No. 8-118573

SUMMARY OF INVENTION

Technical Problem

The present invention has been accomplished in view of the above conventional problems. An object of the present invention is to provide a release film that can be suitably used as a release film for adhesives, a protective film for an adhesive layer of a polarizing plate, a release film used in a process for production of a ceramic capacitor, etc., and is also excellent in solvent resistance.

Solution to Problem

As a result of the present inventors' earnest study in view of the above conventional problems, it has been found that the above problems can be readily solved by using a release film having a specific structure. The present invention has been attained on the basis of this finding.

That is, in an aspect of the present invention, there is provided a release film comprising a polyester film and a coating layer formed on at least one surface of the polyester film, the coating layer comprising a silicone compound and a Gemini surfactant.

Advantageous Effects of Invention

In accordance with the present invention, it is possible to provide a release film that hardly suffers from deterioration in releasing property thereof owing to a solvent used upon processing an adhesive layer when the film is used as a release film for adhesives or a protective film for an adhesive layer of a polarizing plate. Therefore, the present invention has a high industrial value.

DESCRIPTION OF EMBODIMENTS

The polyester film constituting the release film of the present invention may have either a single layer structure or a multilayer structure. Unless departing from the scope of the present invention, the polyester film may have not only a two or three layer structure but also a four or more multilayer structure, and the layer structure of the polyester film is not particularly limited.

The polyester may be either a homopolyester or a copolyester. The homopolyester is preferably obtained by polycondensing an aromatic dicarboxylic acid and an aliphatic glycol. Examples of the aromatic dicarboxylic acid include terephthalic acid and 2,6-naphthalenedicarboxylic acid. Examples of the aliphatic glycol include ethylene glycol, diethylene glycol and 1,4-cyclohexanedimethanol. Typical examples of the polyesters include polyethylene terephthalate and the like. On the other hand, as a dicarboxylic acid component of the copolyester, there may be mentioned one or more compounds selected from the group consisting of isophthalic acid, phthalic acid, terephthalic acid, 2,6-naphthalenedicarboxylic acid, adipic acid, sebacic acid and oxycarboxylic acids (such as, for example, p-oxybenzoic acid). As a glycol component of the copolyester, there may be mentioned one or more compounds selected from the group consisting of ethylene glycol, diethylene glycol, propylene glycol, butanediol, 4-cyclohexanedimethanol and neopentyl glycol.

The polymerization catalyst for production of the polyester is not particularly limited, and any conventionally known compounds may be used as the polymerization catalyst. Examples of the polymerization catalyst include an antimony compound, a titanium compound, a germanium compound, a manganese compound, an aluminum compound, a magnesium compound and a calcium compound.

For the main purposes of imparting good easy-slipping property to the film and preventing occurrence of flaws in the film in the respective steps, particles are preferably compounded in the polyester film. In the case where no particles or only a less amount of particles are compounded in the polyester film, although it is possible to obtain a good film having high transparency, the film tends to be insufficient in slipping property and therefore tends to suffer from formation of flaws.

When compounding the particles in the polyester film, the kind of particles to be compounded in the polyester film is not particularly limited as long as the particles can impart good easy-slipping property to the film. Specific examples of the particles include inorganic particles such as particles of silica, calcium carbonate, magnesium carbonate, barium carbonate, calcium sulfate, calcium phosphate, magnesium phosphate, kaolin, aluminum oxide and titanium oxide, and organic particles such as particles of acrylic reins, styrene resins, urea resins, phenol resins, epoxy resins and benzoguanamine resins, etc. In addition, there may also be used deposited particles obtained by precipitating and finely dispersing a part of metal compounds such as a catalyst during the process for production of the polyester.

In the case where the particles are compounded in the polyester film, from the standpoint of ensuring good transparency of the resulting film without damage to slipping property thereof, the film preferably has a three or more layer structure. Furthermore, in consideration of facilitated production of the film, the three layer structure is more preferred, and the layer structure whose outermost layer comprises the particles is optimum.

On the other hand, the shape of the particles used in the polyester film is also not particularly limited, and may be any of a spherical shape, a massive shape, a bar shape, a flat shape, etc. Furthermore, the hardness, specific gravity, color and the like of the particles are also not particularly limited. These particles may be used in combination of any two or more kinds thereof, if required.

The average particle diameter of the particles used in the polyester film is usually in the range of not more than 5 μm and preferably 0.1 to 3 μm. When the average particle diameter of the particles is more than 5 μm, the obtained film tends to have an excessively coarse surface roughness, so that a surface shape of a molded body to be transferred with the film tends to be adversely affected.

The content of the particles in the polyester film is usually in the range of not more than 5% by weight and preferably 0.0003 to 3% by weight. When the content of the particles in the polyester film is more than 5% by weight, the resulting film tends to be insufficient in transparency.

The method of adding the particles to the polyester film is not particularly limited, and any conventionally known methods can be suitably used therefor. For example, the particles may be added at any optional stages in the process for production of the polyester constituting the respective layers. The particles are preferably added to the polyester after completion of the esterification reaction or transesterification reaction.

Meanwhile, the above polyester film may also comprise, in addition to the above particles, conventionally known additives such as an antioxidant, an antistatic agent, a thermal stabilizer, a lubricant, a dye, a pigment, etc., if required.

The thickness of the polyester film is not particularly limited, and the polyester film may have any thickness as long as the film can be produced while maintaining a suitable film shape. From the standpoint of attaining good mechanical strength, good handling property and high productivity of the polyester film, the thickness of the polyester film is usually in the range of 5 to 300 μm and preferably 10 to 105 μm. In the case where the polyester film is used as a release film for adhesives or a protective film for an adhesive layer for a polarizing plate, the thickness of the polyester film is more preferably in the range of 12 to 50 μm.

As the process of producing the polyester film, there may be used conventionally known film-forming processes, though the present invention is not particularly limited thereto. For example, when producing a biaxially oriented polyester film, there may be used the following production process. That is, the aforementioned polyester raw material is first melt-extruded from a die using an extruder in the form of a molten sheet, and the molten sheet is then cooled and solidified on a chilled roll to obtain an undrawn sheet. In this case, in order to enhance a flatness of the obtained sheet, it is preferred to enhance adhesion between the sheet and the rotary chilled drum. For this purpose, an electrostatic pinning method or a liquid coating adhesion method is preferably used.

Next, the thus obtained undrawn sheet is drawn in one direction thereof using a roll-type or tenter-type drawing machine. The drawing temperature is usually 70 to 120° C. and preferably 80 to 110° C., and the draw ratio is usually 2.5 to 7 times and preferably 3.0 to 6 times. Next, the thus drawn sheet is further drawn in the direction perpendicular to the drawing direction of the first stage. In this case, the drawing temperature is usually 70 to 170° C., and the draw ratio is usually 2.5 to 7 times and preferably 3.0 to 6 times. Successively, the resulting biaxially drawn sheet is heat-set at a temperature of 180 to 270° C. under a tension or under relaxation within 30% to obtain a biaxially oriented film. In the above drawing steps, there may also be used the method in which the drawing in each direction is carried out in two or more stages. In such a case, the multi-stage drawing is preferably performed such that the draw ratio in each of the two directions finally falls within the above-specified range.

In addition, a simultaneous biaxial drawing method may also be used for producing the polyester film. The simultaneous biaxial drawing method is such a method in which the above undrawn sheet is drawn and oriented in both of the machine and width directions at the same time while maintaining the sheet in a suitable temperature-controlled condition in which a temperature of the undrawn sheet is controlled to usually 70 to 120° C. and preferably 80 to 110° C. The draw ratio used in the simultaneous biaxial drawing method is usually 4 to 50 times, preferably 7 to 35 times and more preferably 10 to 25 times in terms of an area ratio of the sheet to be drawn. Successively, the obtained biaxially drawn sheet is heat-set at a temperature of 170 to 270° C. under a tension or under relaxation within 30% to obtain a biaxially drawn oriented film. As the apparatus used in the above simultaneous biaxial drawing method, there may be employed any conventionally known drawing apparatuses such as a screw type drawing apparatus, a pantograph type drawing apparatus and a linear drive type drawing apparatus.

Next, the method of forming the coating layer constituting the release film is explained. As the method of forming the coating layer, there may be used either an in-line coating method in which the surface of the polyester film is subjected to coating treatment during the film-forming step of the polyester film, or an off-line coating method in which the polyester film produced is once transferred to an outside of the film production system and subjected to coating treatment. Among these methods, the coating layer is preferably formed by the in-line coating method.

The in-line coating method is a method in which the coating step is carried out during the process for production of the polyester film, more specifically, such a method in which the coating step is carried out in an optional stage from melt-extrusion of the polyester up to taking-up of the obtained film through the drawing and heat-setting steps. In general, any of the undrawn sheet obtained by melting and rapidly cooling the polyester, the monoaxially drawn film obtained by drawing the undrawn sheet, the biaxially oriented film before the heat-setting, or the film after the heat-setting but before the taking-up may be subjected to the coating step.

For example, when the film is produced by a sequential biaxial drawing method, the method in which the monoaxially drawn film obtained by drawing the undrawn sheet in a longitudinal direction (length direction) thereof is subjected to the coating step, and then the resulting coated monoaxially drawn film is further drawn in a lateral direction thereof is more excellent, though the present invention is not particularly limited thereto. The above method has merits in view of production costs because formation of the film and coating for forming the coating layer can be performed at the same time. In addition, since the drawing is carried out after completion of the coating, the thickness of the coating layer may vary depending upon the draw ratio, so that formation of a thin coating film is more facilitated as compared to the off-line coating method. Also, when providing the coating layer on the film prior to the drawing, the coating layer and the base material film can be drawn together, so that adhesion between the coating layer and the base material film can be strengthened. Furthermore, upon production of the biaxially oriented polyester film, when the film is drawn while grasping end portions of the film with clips, etc., it is possible to constrain the film in both of the longitudinal and lateral directions thereof. This allows exposure of the polyester film to high temperature while keeping a flatness thereof without formation of wrinkles, etc., when being subjected to heat-setting. Therefore, the temperature used in the heat-setting treatment to be conducted after the coating can be raised up to a high temperature which has not been reached in the other conventional methods, so that the film-forming property of the coating layer can be enhanced, and the adhesion between the coating layer and the base material film can be more strengthened. Furthermore, the resulting coating layer becomes firm, and therefore can be enhanced in performance or durability.

In accordance with the present invention, it is essentially required that the release film comprises a coating layer comprising a silicone compound and a Gemini surfactant.

The coating layer of the present invention is provided to impart, to the polyester film, a good releasing performance that renders the film suitably usable, for example, as a release film for adhesives, a protective film for an adhesive layer for a polarizing plate or a release film used in a process for production of a ceramic capacitor, etc.

As a result of various studies conducted by the present inventors to improve uniformity and solvent resistance of the coating layer comprising the silicone compound, it has been found that when utilizing a Gemini surfactant, the obtained coating layer can successfully exhibit good uniformity. In addition, it has also been found that when adding the Gemini surfactant to the coating layer, the resulting coating layer can be further improved in solvent resistance.

The above silicone compound includes those compounds having a silicone structure in a molecule thereof. Examples of the silicone compound include an organopolysiloxane such as polydimethylsiloxane, an acrylic-grafted silicone, a silicone-grafted acrylic compound, an amino-modified silicone, a perfluoroalkyl-modified silicone and an alkyl-modified silicone. Among these silicone compounds, from the standpoint of obtaining the coating layer having the excellent releasing property, the organopolysiloxane such as polydimethylsiloxane is preferred. In addition, from the standpoint of attaining good heat resistance and good anti-contamination property, the coating layer preferably comprises a curing-type silicone compound. Examples of the curing-type silicone compound may include any of curing reaction-type silicone compounds such as an addition curing-type silicone compound, a condensation curing-type silicone compound, an UV curing-type silicone compound, an electron beam curing-type silicone compound, etc. Among these curing-type silicone compounds, the addition curing-type silicone compound is more preferred from the standpoint of enhancing a cohesive force of the obtained coating film.

The addition curing-type silicone compound is a silicone compound comprising an unsaturated hydrocarbon group and a hydrogen group as functional groups in its structure, and subjected to addition curing reaction by the reaction between these functional groups. The unsaturated hydrocarbon group and the hydrogen group are preferably not present within the same molecule from the standpoint of pot life of the silicone compound. Therefore, the unsaturated hydrocarbon group and the hydrogen group as functional groups are respectively present in different silicone molecules, and a mixture comprising these different silicone molecules may be used as the addition curing-type silicone compound.

As the silicone compound comprising the unsaturated hydrocarbon group as a functional group thereof, there may be mentioned unsaturated hydrocarbon group-containing polydimethylsiloxane. It is necessary that at least two unsaturated hydrocarbon groups are included in a molecule of the polydimethylsiloxane. Examples of the unsaturated hydrocarbon group include alkenyl groups having 2 to 8 carbon atoms, such as a vinyl group, a propenyl group, a butenyl group and a pentenyl group. Among these unsaturated hydrocarbon groups, from the standpoint of good industrial availability, preferred is a vinyl group. The at least two alkenyl groups included in the polydimethylsiloxane may be different kinds of alkenyl groups that are different in number of carbon atoms included therein from each other.

The unsaturated hydrocarbon group-containing polydimethylsiloxane may comprise an alkenyl group and a methyl group as functional groups directly bonded to a silicon atom, and may also comprise various other functional groups. Examples of the functional group other than a methyl group include an alkyl group such as an ethyl group, a propyl group and a butyl group; a cycloalkyl group such as a cyclohexyl group; an aryl group such as a phenyl group and a methyl phenyl group; a hydroxy group; an alkoxy group such as a methoxy group and an ethoxy group; and the like. Among the polydimethylsiloxanes comprising these functional groups, from the standpoint of attaining good adhesion property to the polyester film, preferred are those polydimethylsiloxanes comprising a phenyl group or a methoxy group.

As the silicone compound comprising the hydrogen group as a functional group thereof, there may be mentioned hydrogen group-containing polydimethylsiloxane. The hydrogen group-containing polydimethylsiloxane is polydimethylsiloxane comprising a hydrogen atom bonded to a silicon atom. It is necessary that at least two hydrogen atoms bonded to a silicon atom are included in a molecule of the polydimethylsiloxane, and from the standpoint of attaining good curing property of the polydimethylsiloxane, three or more hydrogen atoms bonded to a silicon atom are included in a molecule of the polydimethylsiloxane. The hydrogen atoms bonded to a silicon atom may be respectively present either at a terminal end of a molecular chain of the polydimethylsiloxane or in a side chain of the polydimethylsiloxane.

The hydrogen group-containing polydimethylsiloxane comprises a hydrogen group and a methyl group as functional groups directly bonded to a silicon atom, and may also comprise various other functional groups. Examples of the functional groups other than a methyl group include an alkyl group such as an ethyl group, a propyl group and a butyl group; a cycloalkyl group such as a cyclohexyl group; an aryl group such as a phenyl group and a methyl phenyl group; a hydroxy group; an alkoxy group such as a methoxy group and an ethoxy group; and the like.

The polydimethylsiloxane skeletons of the unsaturated hydrocarbon group-containing polydimethylsiloxane and the hydrogen group-containing polydimethylsiloxane may be respectively either linear or branched.

The compounding ratio of the unsaturated hydrocarbon group-containing polydimethylsiloxane and the hydrogen group-containing polydimethylsiloxane is controlled such that the molar ratio of whole SiH groups to whole alkenyl groups (amount of SiH groups/amount of alkenyl groups) is preferably 1.0 to 3, more preferably 1.1 to 2.0 and even more preferably 1.2 to 1.8. When the molar ratio of whole SiH groups to whole alkenyl groups is less than 1.0, the silicone compound tends to be deteriorated in curing property and tends to be therefore hardly cured sufficiently. When the molar ratio of whole SiH groups to whole alkenyl groups is more than 3, the amount of residual SiH groups in the silicone compound tends to be increased, so that the resulting release film tends to have a heavy peel force to adhesives in some cases.

From the standpoint of ensuring good working environments as well as safety against explosion or fire accident owing to the organic solvent, the coating solution used for forming the coating layer of the present invention preferably comprises water as a main solvent, and the aforementioned silicone compound is preferably in the form of a silicone emulsion. In the case where water is used as a main solvent of the coating solution, the content of water in the coating solution is usually not less than 80% by weight, preferably not less than 90% by weight and even more preferably not less than 95% by weight.

In the case where the silicone compound resin is emulsified, a surfactant component is used as an emulsion stabilizer. As the surfactant, there may be mentioned a nonionic surfactant and an anionic surfactant. Examples of the nonionic surfactant include polyoxyalkylene alkyl ethers such as polyoxyethylene alkyl ethers, polyoxyalkylene phenyl ethers such as polyoxyethylene phenyl ether, glycerin alkyl ethers, glycerin fatty acid esters and alkylene glycol adducts thereof, polyglycerin fatty acid esters and alkylene glycol adducts thereof, propylene glycol fatty acid esters and alkylene glycol adducts thereof, polyalkylene glycol fatty acid esters and the like. Examples of the anionic surfactant include fatty acid soaps such as sodium stearate and triethanolamine palmitate, alkyl ether carboxylic acids and salts thereof, alkyl sulfonic acids, alkene sulfonic acid salts, sulfonic acid salts of fatty acid esters, alkyl sulfuric acid ester salts, secondary higher alcohol sulfuric acid ester salts, alkyl and allyl ether sulfuric acid ester salts, fatty acid ester sulfuric acid ester salts, polyoxyethylene alkyl sulfuric acid ester salts, sulfuric acid ester salts such as turkey red oil, alkyl phosphoric acid salts, ether phosphoric acid salts, alkyl allyl ether phosphoric acid salts, amide phosphoric acid salts and the like. Among these surfactants, preferred are nonionic surfactants, and from the standpoint of good stability of the silicone emulsion, more preferred are polyoxyalkylene alkyl ethers and polyoxyalkylene phenyl ethers.

Examples of the polyoxyalkylene alkyl ethers include polyoxyethylene alkyl ethers, polyoxypropylene alkyl ethers and polyoxybutylene alkyl ethers. Among these polyoxyalkylene alkyl ethers, preferred are polyoxyethylene alkyl ethers. In addition, the alkyl group included in the polyoxyalkylene alkyl ethers is preferably a linear or branched alkyl group having 8 to 30 carbon atoms and more preferably a linear or branched alkyl group having 8 to 16 carbon atoms.

Examples of the polyoxyalkylene phenyl ethers include polyoxyethylene phenyl ethers, polyoxypropylene phenyl ethers and polyoxybutylene phenyl ethers. Among these polyoxyalkylene phenyl ethers, preferred are polyoxyethylene alkyl ethers. In addition, the phenyl group included in the polyoxyalkylene phenyl ethers is an unsubstituted or substituted phenyl group, and preferably a styrenated phenyl group formed by substituting a hydrogen atom of a phenyl group with a styryl group.

On the other hand, the Gemini surfactant is one kind of surfactant, and is in the form of a compound comprising at least two hydrophilic groups and at least two hydrophobic groups. The Gemini surfactant has such a structure in which at least two structural moieties each comprising at least one hydrophilic group and at least one hydrophobic group are bonded to each other through a spacer. A plurality of the hydrophilic groups and a plurality of the hydrophobic groups which are included in the Gemini surfactant may be respectively the same or different from each other.

The hydrophilic group and the hydrophobic group in the Gemini surfactant are not particularly limited as long as they are conventional known functional groups. Examples of the hydrophilic group include a hydroxy group, (poly)alkyleneoxide derivatives such as (poly)ethyleneoxide derivatives, (poly)alkyleneoxide alkyl ether derivatives, a carboxy group, a sulfonic group, a phosphoric group, an ammonium group, an amino group, an amide group and salts of these groups. Among these hydrophilic groups, from the standpoint of good stability of the coating solution, preferred are a hydroxy group or (poly)alkyleneoxide derivatives.

The hydrophobic group is an organic group other than the hydrophilic group. Examples of the hydrophobic group include hydrocarbon groups, e.g., alkyl groups having 4 to 20 carbon atoms such as 1-methylpropyl, 1,3-dimethylpropyl, n-butyl, 1-methylbutyl, 1,3-dimethylbutyl, n-pentyl, 1-methylpentyl, 1,3-dimethylpentyl, n-hexyl, 2-ethylhexyl, n-decyl, n-dodecyl, sec-tridecyl, octadecyl, isooctadecyl and eicosyl; alkenyl groups such as 3-butenyl, 5-hexenyl, 5-decenyl, 11-dodecenyl and 11-octadodecenyl; aryl groups such as phenyl, nonylphenyl, octylphenyl and naphthyl; and aryl alkyl groups such as benzyl, phenylethyl, phenylpropyl, phenylhexyl and nonylphenylethyl, as well as fluorine-containing hydrocarbon groups, e.g., fluoroalkyl groups having 4 to 20 carbon atoms such as n-perfluorobutyl, n-perfluorohexyl, 2-perfluoroethylhexyl, n-perfluorodecyl, n-perfluorododecyl, perfluorooctadecyl, perfluoroisooctadecyl and perfluoroeicosyl; fluoroalkenyl groups such as 3-perfluorobutenyl, 5-perfluorohexenyl, 5-perfluorodecenyl and 11-perfluorooctadecenyl; fluoroaryl groups such as perfluorophenyl, perfluorononylphenyl, perfluorooctylphenyl and perfluoronaphthyl. Among these hydrophobic groups, from the standpoint of good industrial availability, preferred are alkyl groups, and more preferred are n-butyl, 1-methylbutyl, 1,3-dimethylbutyl, 1-methylpentyl and 1,3-dimethylpentyl.

The spacer is not particularly limited as long as it is an organic group that is capable of chemically bonding the hydrophilic group-containing organic group and the hydrophobic group-containing organic group to each other. Examples of the spacer include divalent organic groups, e.g., structures formed by removing two hydrogen atoms from saturated hydrocarbons having 1 to 24 carbon atoms, carbon-carbon double bond-containing unsaturated hydrocarbons having 2 to 24 carbon atoms and carbon-carbon triple bond-containing unsaturated hydrocarbons having 1 to 24 carbon atoms, and arylene groups such as 1,4-phenylene, 1,2-phenylene, 1,3-phenylene, 2-methyl-1,4-phenylene, 2,5-dimethyl-1,4-phenylene and 1,4-naphthylene. Further examples of the spacer include structures formed by further bonding an oxygen atom, a nitrogen atom, a sulfur atom, a halogen atom or the like to the aforementioned divalent organic groups. Among these spacers, from the standpoint of strengthened molecular structure of the surfactant, less deactivation of a catalyst and more effective attainment of advantageous effects of the surfactant, preferred are those derived from triple bond-containing unsaturated hydrocarbons and arylenes, and more preferred is acetylene.

The most preferred form of the Gemini surfactant is a structure comprising a hydroxy group or (poly)ethyleneoxide as the hydrophilic group, an alkyl group as the hydrophobic group and acetylene as the spacer, namely, acetylene glycol or an ethoxylated product of acetylene glycol.

Examples of the acetylene glycol include 2,5,8,11-tetramethyl-6-dodecyne-5,8-diol, 5,8-dimethyl-6-dodecyne-5,8-diol, 2,4,7,9-tetramethyl-5-decyne-4,7-diol, 4,7-dimethyl-5-decyne-4,7-diol, 2,3,6,7-tetramethyl-4-octyne-3,6-diol, 3,6-dimethyl-4-octyne-3,6-diol, etc. In addition, examples of the ethoxylated product of acetylene glycol include the aforementioned ethyleneoxide derivatives of acetylene glycol. Among these acetylene glycols, from the standpoint of uniformity of the resulting coating film, more preferred is 2,4,7,9-tetramethyl-5-decyne-4,7-diol or ethyleneoxide derivatives thereof. In addition, in the case of the ethyleneoxide derivatives, the total molar number of ethyleneoxide units added in a molecule of the ethyleneoxide derivatives is usually in the range of 1 to 40 mol, preferably 1 to 25 mol and more preferably 2 to 15 mol from the standpoint of attaining good surfactant effects and good defoaming property. Meanwhile, the Gemini surfactant used in the present invention has a structure comprising a plurality of hydrophilic groups, and the total molar number of ethyleneoxide units added therein means a sum of molar numbers of the plural hydrophilic groups added.

Conventionally, in a composition for addition-type curing reaction of a silicone, an acetylene derivative may be used as a catalytic activity inhibitor for the purpose of suppressing activity of the catalyst, in some cases. The 2,4,7,9-tetramethyl-5-decyne-4,7-diol or ethyleneoxide derivatives thereof as the most preferred form of the Gemini surfactant used in the present invention also comprises an acetylene group in its structure. However, the acetylene derivative conventionally used as a catalytic activity inhibitor comprises the acetylene group at a terminal end of a molecular structure thereof. On the other hand, the Gemini surfactant used in the present invention comprises the acetylene group within a skeleton of a molecular structure thereof and therefore has a steric hindrance structure around the acetylene group. For this reason, the Gemini surfactant exhibits poor effects as the catalytic activity inhibitor. Thus, the Gemini surfactant has a less influence on the addition-type curing reaction of a silicone, and therefore can be clearly distinguished from the catalytic activity inhibitor.

The time of mixing of the Gemini surfactant and the silicone compound is not particularly limited. The Gemini surfactant is used not for emulsifying the silicone, but for improving uniformity and solvent resistance upon coating. Therefore, it is preferred that the Gemini surfactant is added to the silicone emulsion emulsified with a nonionic surfactant. In addition, the time of addition of the Gemini surfactant is preferably during the steps to be conducted within 20 hours and preferably within 10 hours immediately before the coating step.

Upon forming the coating layer of the release film, in order to improve appearance and transparency of the obtained coating layer, adhesion between the coating layer and the base material and emulsion stability of the silicone emulsion, and control the releasing property of the release film, various polymers may be used in combination with the aforementioned components.

The kinds of polymers used in the coating layer are not particularly limited, and any of the conventionally known polymers may be used unless they have no adverse influence on the curing reaction of the silicone. Specific examples of the polymers include polyvinyl alcohol, polyester resins, acrylic resins, urethane resins, polyalkylene glycols, methyl cellulose, hydroxy cellulose, starches, etc. Among these polymers, from the standpoint of improving adhesion property to the base material, preferred are polyvinyl alcohol and polyester resins, and from the standpoint of improving emulsion stability of the silicone emulsion, more preferred is polyvinyl alcohol. In addition, from the standpoint of allowing the silicone emulsion to more effectively exhibit good emulsion stability, the polymers are also preferably used upon emulsification of the silicone compound.

The polyvinyl alcohol is a compound having a polyvinyl alcohol moiety. As the polyvinyl alcohol, there may be used conventionally known polyvinyl alcohols including modified compounds obtained, for example, by partially acetalizing or butyralizing polyvinyl alcohol. The polymerization degree of the polyvinyl alcohol is not particularly limited, and is usually not less than 100, and preferably in the range of 300 to 40000. When the polymerization degree of the polyvinyl alcohol is less than 100, there tends to occur deterioration in the effect of stabilizing the silicone emulsion or the effect of improving the adhesion property to the base material. The saponification degree of the polyvinyl alcohol is also not particularly limited, and is in the range of usually not less than 70 mol % and preferably 80 to 99.9 mol %.

As main constituents of the polyester resins, there may be mentioned the following polycarboxylic acids and polyhydroxy compounds. More specifically, examples of the polycarboxylic acids include terephthalic acid, isophthalic acid, orthophthalic acid, phthalic acid, 4,4'-diphenyldicarboxylic acid, 2,5-naphthalenedicarboxylic acid, 1,5-naphthalenedicarboxylic acid, 2,6-naphthalenedicarboxylic acid, 2,7-naphthalenedicarboxylic acid, 1,4-cyclohexanedicarboxylic acid, 2-potassium sulfo-terephthalic acid, 5-sodium sulfo-isophthalic acid, adipic acid, azelaic acid, sebacic acid, dodecanedicarboxylic acid, glutaric acid, succinic acid, trimellitic acid, trimesic acid, pyromellitic acid, trimellitic anhydride, phthalic anhydride, p-hydroxybenzoic acid, trimellitic acid monopotassium salt and ester-forming derivatives thereof. Examples of the polyhydroxy compounds include ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexane dimethanol, p-xylylene glycol, an adduct of bisphenol A with ethylene glycol, diethylene glycol, triethylene glycol, polyethylene glycol, polypropylene glycol, polytetramethylene glycol, polytetramethyleneoxide glycol, dimethylol propionic acid, glycerin, trimethylol propane, sodium dimethylol ethyl sulfonate and potassium dimethylol propionate. The polyester resins may be synthesized by subjecting one or more compounds appropriately selected from the aforementioned respective compounds to polycondensation reaction by an ordinary method.

The urethane resins are in the form of a polymer compound having a urethane bond in a molecule thereof, and may be usually produced by the reaction between a polyol and an isocyanate. Examples of the polyol include polycarbonate polyols, polyester polyols, polyether polyols, polyolefin polyols and acrylic polyols. These compounds may be used alone or in combination of any two or more thereof.

The polycarbonate polyols may be obtained by subjecting a polyhydric alcohol and a carbonate compound to dealcoholization reaction. Examples of the polyhydric alcohol include ethylene glycol, 1,2-propylene glycol, 1,3-propylene glycol, 1,2-butanediol, 1,3-butanediol, 1,4-butanediol, 1,5-pentanediol, 1,6-hexanediol, 1,4-cyclohexanediol, 1,4-cyclohexane dimethanol, 1,7-heptanediol, 1,8-octanediol, 1,9-nonanediol, 1,10-decanediol, neopentyl glycol, 3-methyl-1,5-pentanediol and 3,3-dimethylol heptane. Examples of the carbonate compound include dimethyl carbonate, diethyl carbonate, diphenyl carbonate and ethylene carbonate. Examples of the polycarbonate polyols obtained by the reaction between the above compounds include poly(1,6-hexylene)carbonate and poly(3-methyl-1,5-pentylene)carbonate.

Examples of the polyester polyols include those compounds produced by reacting a polycarboxylic acid (such as malonic acid, succinic acid, glutaric acid, adipic acid, pimelic acid, suberic acid, sebacic acid, fumaric acid, maleic acid, terephthalic acid and isophthalic acid) or an acid anhydride thereof with a polyhydric alcohol (such as ethylene glycol, diethylene glycol, triethylene glycol, propylene glycol, dipropylene glycol, tripropylene glycol, butanediol, 1,3-butanediol, 1,4-butanediol, 2,3-butanediol, 2-methyl-1,3-propanediol, 1,5-pentanediol, neopentyl glycol, 1,6-hexanediol, 3-methyl-1,5-pentanediol, 2-methyl-2,4-pentanediol, 2-methyl-2-propyl-1,3-propanediol, 1,8-octanediol, 2,2,4-trimethyl-1,3-pentanediol, 2-ethyl-1,3-hexanediol, 2,5-dimethyl-2,5-hexanediol, 1,9-nonanediol, 2-methyl-1,8-octanediol, 2-butyl-2-ethyl-1,3-propanediol, 2-butyl-2-hexyl-1,3-propanediol, cyclohexanediol, bishydroxymethylcyclohexane, dimethanol benzene, bishydroxyethoxybenzene, alkyl dialkanol amines and lactonediol).

Examples of the polyether polyols include polyethylene glycol, polypropylene glycol, polyethylene/propylene glycol, polytetramethylene ether glycol and polyhexamethylene ether glycol.

Examples of a polyisocyanate compound used for producing the urethane resins include aromatic diisocyanates such as tolylene diisocyanate, xylylene diisocyanate, methylene diphenyl diisocyanate, phenylene diisocyanate, naphthalene diisocyanate and tolidine diisocyanate; aromatic ring-containing aliphatic diisocyanates such as α,α,α',α'-tetramethyl xylylene diisocyanate; aliphatic diisocyanates such as methylene diisocyanate, propylene diisocyanate, lysine diisocyanate, trimethyl hexamethylene diisocyanate and hexamethylene diisocyanate; and alicyclic diisocyanates such as cyclohexane diisocyanate, methyl cyclohexane diisocyanate, isophorone diisocyanate, dicyclohexylmethane diisocyanate and isopropylidene dicyclohexyl diisocyanate. These polyisocyanate compounds may be used alone or in combination of any two or more thereof.

When the urethane resins are synthesized, there may be used a chain extender. The chain extender is not particularly limited, and any chain extender may be used as long as it has two or more active groups capable of reacting with an isocyanate group. In general, there may be mainly used a chain extender having two hydroxyl groups or two amino groups.

Examples of the chain extender having two hydroxyl groups include glycols, e.g., aliphatic glycols such as ethylene glycol, propylene glycol and butanediol; aromatic glycols such as xylylene glycol and bishydroxyethoxybenzene; and ester glycols such as neopentyl glycol hydroxypivalate. Examples of the chain extender having two amino groups include aromatic diamines such as tolylenediamine, xylylenediamine and diphenylmethanediamine; aliphatic diamines such as ethylenediamine, propylenediamine, hexanediamine, 2,2-dimethyl-1,3-propanediamine, 2-methyl-1,5-pentanediamine, trimethyl hexanediamine, 2-butyl-2-ethyl-1,5-pentanediamine, 1,8-octanediamine, 1,9-nonanediamine and 1,10-decanediamine; and alicyclic diamines such as 1-amino-3-aminomethyl-3,5,5-trimethyl cyclohexane, dicyclohexylmethanediamine, isopropylidenecyclohexyl-4,4'-diamine, 1,4-diaminocyclohexane and 1,3-bisaminomethyl cyclohexane.

The urethane resins may be dispersed or dissolved in a solvent as a medium, and is preferably dispersed or dissolved in water as the medium. In order to disperse or dissolve the urethane resins in water, there may be used those urethane resins of a forcibly emulsifiable type which can be dispersed and dissolved using an emulsifier, or those urethane resins of a self-emulsifiable type or a water-soluble type which are obtained by introducing a hydrophilic group into the urethane resins. Among these urethane resins, in particular, self-emulsifiable type urethane resins which are ionomerized by introducing an ionic group into a structure of the urethane resins are preferred because they are excellent in storage stability of the coating solution as well as excellent in water resistance and transparency of the resulting coating layer. Examples of the ionic group to be introduced into the urethane resins include various groups such as a carboxyl group, a sulfonic acid group, a phosphoric acid group, a phosphonic acid group and a quaternary ammonium group. Among these ionic groups, preferred is a carboxyl group. As the method of introducing a carboxyl group into the urethane resins, there may be used various methods which may be carried out in respective stages of the polymerization reaction. For example, there may be used the method in which a carboxyl group-containing resin is used as a comonomer component upon synthesis of a prepolymer, or the method in which a carboxyl group-containing component is used as one of the components including the polyol, the polyisocyanate, the chain extender or the like. In particular, there is preferably used the method in which a carboxyl group-containing diol is used to introduce a desired amount of a carboxyl group into the urethane resins by suitably adjusting an amount of the diol charged. For example, the diol used in the polymerization for production of the urethane resins may be copolymerized with dimethylol propionic acid, dimethylol butanoic acid, bis-(2-hydroxyethyl)propionic acid, bis-(2-hydroxyethyl)butanoic acid, etc. Furthermore, the carboxyl group is preferably in the form of a salt obtained by neutralizing the carboxyl group with ammonia, an amine, an alkali metal, an inorganic alkali compound, etc.

The above acrylic resins are in the form of a polymer obtained from a polymerizable monomer including an acrylic monomer or a methacrylic monomer. The polymer may also be in the form of either a homopolymer or a copolymer of the aforementioned polymerizable monomer, or a copolymer of the aforementioned polymerizable monomer with a polymerizable monomer other than the acrylic monomer and the methacrylic monomer. The polymer may also include a copolymer of the polymer with the other polymer (such as, for example, a polyester and a polyurethane). Examples of the copolymer include a block copolymer and a graft copolymer. In addition, the polymer may also include a polymer obtained by polymerizing the polymerizable monomer in a polyester solution or a polyester dispersion (which may also be in the form of a mixture of the polymers in some cases). Furthermore, the polymer may also include a polymer obtained by polymerizing the polymerizable monomer in a polyurethane solution or a polyurethane dispersion (which may also be in the form of a mixture of the polymers in some cases). Similarly, the polymer may also include a polymer obtained by polymerizing the polymerizable monomer in the other polymer solution or the other polymer dispersion (which may also be in the form of a mixture of the polymers in some cases). The acrylic resins may also comprise a hydroxyl group or an amino group in order to further improve the adhesion property to the base material.

The above polymerizable monomer is not particularly limited. Examples of the especially typical compounds as the polymerizable monomer include various carboxyl group-containing monomers such as acrylic acid, methacrylic acid, crotonic acid, itaconic acid, fumaric acid, maleic acid and citraconic acid, and salts thereof; various hydroxyl group-containing monomers such as 2-hydroxyethyl (meth)acrylate, 2-hydroxypropyl (meth)acrylate, 4-hydroxybutyl (meth)acrylate, monobutylhydroxyl fumarate and monobutylhydroxyl itaconate; various (meth)acrylic acid esters such as methyl (meth)acrylate, ethyl (meth) acrylate, propyl (meth)acrylate, butyl (meth)acrylate and lauryl (meth)acrylate; various nitrogen-containing compounds such as (meth)acrylamide, diacetone acrylamide, N-methylol acrylamide and (meth)acrylonitrile; various styrene derivatives such as styrene, α-methyl styrene, divinyl benzene and vinyl toluene; various vinyl esters such as vinyl propionate; various silicon-containing polymerizable monomers such as γ-methacryloxypropyl trimethoxysilane and vinyl trimethoxysilane; various phosphorus-containing vinyl-based monomers; various halogenated vinyl-based monomers such as vinyl chloride and vinylidene chloride; and various conjugated dienes such as butadiene.

Upon forming the coating layer, a catalytic amount of a platinum group metal catalyst may be used in combination with the aforementioned components. The platinum group metal catalyst acts for promoting the addition curing-type reaction of the silicone compound, and there may be used any conventionally known catalysts that are known as an addition reaction catalyst. Examples of the platinum group metal catalyst include a platinum-based catalyst, a palladium-based catalyst, a rhodium-based catalyst, etc. Among these platinum group metal catalysts, preferred is the platinum-based catalyst. Specific examples of the platinum-based catalyst include chloroplatinic acid, an alcohol solution or an aldehyde solution of chloroplatinic acid, complexes of chloroplatinic acid with various olefins or vinyl siloxanes, etc. From the standpoint of improving pot life of the coating solution, the time of addition of the platinum group metal catalyst is preferably during the steps to be conducted within 20 hours and more preferably within 10 hours immediately before the coating step.

Furthermore, unless the subject matter of the present invention is adversely affected, upon forming the coating layer, in combination with the aforementioned components, there may also be used a catalyst activity inhibitor such as acetylene derivatives having an acetylene structure at a terminal end thereof, such as 1-octyne and ethynyl cyclohexanol, various organic nitrogen compounds, various phosphorus compounds, oxime compounds and organic halogen compounds, a crosslinking agent such as oxazoline compounds, epoxy compounds and silane coupling agents, particles, as well as various other additives such as a defoaming agent, a coatability improver, a thickening agent, an organic lubricant, an antistatic agent, an ultraviolet absorber, an antioxidant, a foaming agent, a dye and a pigment, if required.

The content of the silicone compound in the coating layer is usually not less than 30% by weight, preferably not less than 40% by weight, more preferably not less than 50% by weight and even more preferably not less than 60% by weight based on a total weight of whole components of the coating layer, and the upper limit of the content of the silicone compound in the coating layer is usually 99% by weight. When the content of the silicone compound in the coating layer is less than 30% by weight, the resulting release film tends to fail to exhibit sufficient releasing property.

The content of the Gemini surfactant in the coating layer is usually in the range of 0.01 to 5% by weight, preferably 0.05 to 3% by weight and more preferably 0.1 to 1.8% by weight based on a total weight of whole components in the coating layer. When the content of the Gemini surfactant in the coating layer is less than 0.01% by weight, the surfactant tends to fail to exhibit sufficient surface activating effect. When the content of the Gemini surfactant in the coating layer is more than 5% by weight, the surfactant tends to be hardly dispersed in the coating solution, so that the performance of the resulting coating film tends to be adversely affected thereby.

In the case where the polymer is added to the coating layer, the amount of the polymer added to the coating layer is usually in the range of 0.1 to 50 parts by weight, preferably 1 to 30 parts by weight and more preferably 2 to 20 parts by weight based on 100 parts by weight of the silicone compound. When the amount of the polymer added to the coating layer falls within the aforementioned range, it is possible to improve the adhesion property of the coating layer to the base material and effectively exhibit good emulsion stability.

In the case where the platinum group metal catalyst is added to the coating layer, the amount of the platinum group metal catalyst added to the coating layer is preferably in the range of 1 to 1000 ppm and more preferably 20 to 800 ppm based on whole components in the coating layer. When the amount of the platinum group metal catalyst added to the coating layer falls within the aforementioned range, it is possible to adequately satisfy both of promotion of the addition-type curing reaction and the pot life of the coating solution.

The analysis of the components included in the coating layer may be conducted, for example, by analyzing methods such as TOF-SIMS, ESCA and fluorescent X-ray analysis.

When forming the coating layer by an in-line coating method, the coating solution having a concentration of about 0.1 to about 50% by weight in terms of a solid content thereof which is prepared in the form of an aqueous solution or a water dispersion comprising a series of the aforementioned compounds is preferably applied onto the polyester film. The coating solution may also comprise a small amount of an organic solvent for the purpose of improving the dispersibility in water, the film-forming property, etc., unless the subject matter of the present invention is adversely affected by addition of the organic solvent. The organic solvents may be used alone, or may be appropriately used in the form of a mixture of any two or more thereof.

The film thickness of the coating layer is usually in the range of 0.005 to 1 μm, preferably 0.02 to 0.5 μm and more preferably 0.05 to 0.2 μm. When the film thickness of the coating layer is more than 1 μm, the resulting coating film tends to be deteriorated in appearance or tends to be insufficient in cured condition. When the film thickness of the coating layer is less than 0.005 μm, the resulting coating layer tends to fail to exhibit sufficient releasing property.

As the method of forming the coating layer, there may be used conventionally known coating methods, for example, such as a gravure coating method, a reverse roll coating method, a die coating method, an air doctor coating method, a blade coating method, a rod coating method, a bar coating method, a curtain coating method, a knife coating method, a transfer roll coating method, a squeeze coating method, an impregnation coating method, a kiss-roll coating method, a spray coating method, a calender coating method and an extrusion coating method.

The drying and curing conditions used upon forming the coating layer on the polyester film are as follows. For example, in the case where the coating layer is formed by an off-line coating method, the coating layer may be subjected to heat-setting treatment usually at a temperature of 80 to 200° C. for 3 to 40 sec and preferably at a temperature of 100 to 180° C. for 3 to 40 sec.

On the other hand, in the case where the coating layer is formed by an in-line coating method, the coating layer may be subjected to heat-setting treatment usually at a temperature of 70 to 270° C. for 3 to 200 sec.

In addition, irrespective of any of the off-line coating method and in-line coating method, the above heat-setting treatment may be conducted in combination with irradiation with an active energy beam such as UV irradiation. The polyester film constituting the laminated polyester film according to the present invention may also be previously subjected to surface treatments such as corona treatment and plasma treatment.

The peel force of the release film of the present invention against an acrylic adhesive tape is usually less than 50 mN/cm, preferably not more than 40 mN/cm and more preferably not more than 35 mN/cm.

EXAMPLES

The present invention is described in more detail below by Examples. However, these Examples are only illustrative and not intended to limit the present invention thereto, and any changes and modifications are possible unless departing from the scope of the present invention. In addition, the measuring and evaluating methods used in the present invention are as follows.

(1) Method of Measuring Intrinsic Viscosity of Polyester:

One gram of a polyester from which the other polymer components incompatible with the polyester and pigments were previously removed was accurately weighed, and mixed with and dissolved in 100 mL of a mixed solvent comprising phenol and tetrachloroethane at a weight ratio of 50:50, and a viscosity of the resulting solution was measured at 30° C.

(2) Measurement of Average Particle Diameter (d50):

Using a centrifugal precipitation type particle size distribution measuring apparatus "SA-CP3 Model" manufactured by Shimadzu Corporation, the particle size corresponding to a cumulative fraction of 50% in equivalent spherical distribution of the particles was measured as an average particle diameter d50 of the particles.

(3) Method of Measuring Film Thickness of Coating Layer:

The surface of the coating layer was dyed with $RuO_4$, and the resulting film was embedded in an epoxy resin.

Thereafter, the resin-embedded film was cut into a piece by an ultrathin sectioning method, and the cut piece was dyed with $RuO_4$ to observe and measure a cut section of the coating layer using TEM ("H-7650" manufactured by Hitachi High-Technologies Corp.; acceleration voltage: 100 V).

(4) Evaluation of Peel Force of Release Film:

A double-sided adhesive tape "No. 502" produced by Nitto Denko Corporation was cut into a width of 5 cm, and one surface of the thus cut double-sided adhesive tape was press-contacted and attached onto a surface of a release layer of a sample film by allowing a 2 kg rubber roller to move thereover by one reciprocative motion, and the resulting laminated film was allowed to stand at room temperature for 1 hr and then subjected to measurement of a peel force thereof. Upon the measurement of the peel force, the film was subjected to 180° peel test at an elastic stress rate of 300 mm/min using "Ezgraph" manufactured by Shimadzu Corporation.

(5) Evaluation of Peel Force of Release Film after Heating:

A double-sided adhesive tape "No. 502" produced by Nitto Denko Corporation was cut into a width of 5 cm, and one surface of the thus cut double-sided adhesive tape was press-contacted and attached onto a surface of a release layer of a sample film by allowing a 2 kg rubber roller to move thereover by one reciprocative motion, and then the resulting laminated film was heated in an oven at 100° C. for 1 hr. Thereafter, the film was allowed to stand at room temperature for 1 hr and then subjected to measurement of a peel force thereof. Upon the measurement of the peel force, the film was subjected to 180° peel test at an elastic stress rate of 300 mm/min using a tensile tester "Ezgraph" manufactured by Shimadzu Corporation.

(6) Evaluation of Peel Force of Release Film after being Treated with Solvent:

"BEMCOT M-3II" produced by Asahi Kasei Fibers Corporation was impregnated with 4 mL of toluene and fitted to a rubbing tester manufactured by Taihei Rika Kogyo Co., Ltd., and then moved over a surface of a release layer of a sample film by 10 reciprocative motions while applying an arm load of 680 g thereto. After air-drying the film, one surface of a double-sided adhesive tape "No. 502" produced by Nitto Denko Corporation which was cut into a width of 5 cm was press-contacted and attached onto the film by allowing a 2 kg rubber roller to move thereover by one reciprocative motion, and the resulting laminated film was allowed to stand at room temperature for 1 hr and then subjected to measurement of a peel force thereof. Upon the measurement of the peel force, the film was subjected to 1800 peel test at an elastic stress rate of 300 mm/min using "Ezgraph" manufactured by Shimadzu Corporation.

The polyesters used in Examples and Comparative Examples were prepared as follows.

<Method for Producing Polyester (A)>

One hundred parts by weight of dimethyl terephthalate and 60 parts by weight of ethylene glycol as starting materials were charged together with 0.09 part by weight of magnesium acetate tetrahydrate as a catalyst into a reactor, and the reaction therebetween was initiated at 150° C. The reaction temperature was gradually raised while distilling off methanol produced, and allowed to reach 230° C. after 3 hr. After the elapse of 4 hr, the transesterification reaction was substantially terminated. The obtained reaction mixture was mixed with 0.04 part by weight of ethyl acid phosphate. Furthermore, the reaction mixture thus obtained was mixed with 0.04 part by weight of antimony trioxide, followed by subjecting the mixture to polycondensation reaction for 4 hr. More specifically, the reaction temperature was gradually raised from 230° C. until reaching 280° C. On the other hand, the reaction pressure was gradually reduced from normal pressure until finally reaching 0.3 mmHg. After initiation of the reaction, an agitation power in the reaction vessel was monitored, and the reaction was terminated at the time at which a viscosity of the reaction solution reached the value corresponding to an intrinsic viscosity of 0.63, which was determined by the change in agitation power in the reaction vessel. The resulting polymer was discharged from the reaction vessel under applied pressure of a nitrogen gas introduced. As a result, it was confirmed that the thus obtained polyester (A) had an intrinsic viscosity of 0.63.

<Method for Producing Polyester (B)>

The same procedure as described in the above method for producing the polyester (A) was conducted except that after adding 0.04 part by weight of ethyl acid phosphate, 0.2 part by weight of silica particles having an average particle diameter of 2 μm and 0.04 part by weight of antimony trioxide were added, and the polycondensation reaction was terminated at the time at which a viscosity of the reaction solution reached the value corresponding to an intrinsic viscosity of 0.65, thereby obtaining a polyester (B). As a result, it was confirmed that the thus obtained polyester (B) had an intrinsic viscosity of 0.65.

Examples of the compounds constituting the coating layer are as follows.

Silicone Compound: (IA)

Silicone emulsion of an O/W type produced by mixing a vinyl group-containing polydimethylsiloxane and a hydrogen group-containing polydimethylsiloxane such that a molar ratio of whole SiH groups to whole alkenyl groups in the resulting mixture was 1.47, and adding a polyvinyl alcohol having a saponification degree of 90 mol % (in an amount of 14 parts by weight based on 100 parts by weight of the silicone compound), polyoxyethylene tridecyl ether (in an amount of 2 parts by weight based on 100 parts by weight of the silicone compound), ethynyl cyclohexanol as a catalytic activity inhibitor (in an amount of 0.4 part by weight based on 100 parts by weight of the silicone compound) and water to the mixture, followed by uniformly mixing the obtained mixture while stirring and subjecting the mixture to phase inversion.

Silicone Compound: (IB)

Silicone emulsion of an O/W type produced by mixing a vinyl group-containing polydimethylsiloxane and a hydrogen group-containing polydimethylsiloxane such that a molar ratio of whole SiH groups to whole alkenyl groups in the resulting mixture was 1.52, and adding a polyvinyl alcohol having a saponification degree of 90 mol % (in an amount of 14 parts by weight based on 100 parts by weight of the silicone compound), polyoxyethylene tridecyl ether (in an amount of 2 parts by weight based on 100 parts by weight of the silicone compound), ethynyl cyclohexanol as a catalytic activity inhibitor (in an amount of 0.4 part by weight based on 100 parts by weight of the silicone compound) and water to the mixture, followed by uniformly mixing the obtained mixture while stirring and subjecting the mixture to phase inversion.

Silicone Compound: (IC)

Silicone emulsion of an O/W type produced by mixing a vinyl group-containing polydimethylsiloxane and a hydrogen group-containing polydimethylsiloxane such that a molar ratio of whole SiH groups to whole alkenyl groups in the resulting mixture was 1.60, and adding a polyvinyl alcohol having a saponification degree of 90 mol % (in an amount of 14 parts by weight based on 100 parts by weight of the silicone compound), polyoxyethylene tridecyl ether (in an amount of 2 parts by weight based on 100 parts by weight of the silicone compound), ethynyl cyclohexanol as a catalytic activity inhibitor (in an amount of 0.4 part by weight based on 100 parts by weight of the silicone compound) and water to the mixture, followed by uniformly mixing the obtained mixture while stirring and subjecting the mixture to phase inversion.

Silicone Compound: (ID)

Silicone emulsion of an O/W type produced by mixing a vinyl group-containing polydimethylsiloxane and a hydrogen group-containing polydimethylsiloxane such that a molar ratio of whole SiH groups to whole alkenyl groups in the resulting mixture was 1.47, and adding a polyvinyl alcohol having a saponification degree of 90 mol % (in an amount of 20 parts by weight based on 100 parts by weight of the silicone compound), polyoxyethylene tridecyl ether (in an amount of 2 parts by weight based on 100 parts by weight of the silicone compound), ethynyl cyclohexanol as a catalytic activity inhibitor (in an amount of 0.4 part by weight based on 100 parts by weight of the silicone compound) and water to the mixture, followed by uniformly mixing the obtained mixture while stirring and subjecting the mixture to phase inversion.

Gemini Surfactant: (IIA)

Ethoxylated product of 2,4,7,9-tetramethyl-5-decyne-4,7-diol; total molar number of ethyleneoxide added: 3.5; HLB=8

Gemini Surfactant: (IIB)

Ethoxylated product of 2,4,7,9-tetramethyl-5-decyne-4,7-diol; total molar number of ethyleneoxide added: 10; HLB=13

Platinum Group Metal Catalyst: (III)
Complex of chloroplatinic acid and vinyl siloxane

Example 1

A mixed raw material obtained by mixing the polyesters (A) and (B) in amounts of 90% and 10%, respectively, as a raw material for outermost layers (surface layers), and a raw material for an intermediate layer comprising the polyester (A) solely, were respectively charged into two extruders, melted therein at 285° C., and then co-extruded therefrom on a chilled roll whose surface was controlled to a temperature of 40° C., into a two-kind/three-layer structure (surface layer/intermediate layer/surface layer=1:8:1 as output), followed by cooling and solidifying the thus extruded sheet on the chilled roll, thereby obtaining an undrawn sheet. Next, the thus obtained undrawn sheet was drawn utilizing a difference between peripheral speeds of rolls at a film temperature of 85° C. at a draw ratio of 3.4 times in a longitudinal direction thereof. Thereafter, a coating solution 1 shown in the below-mentioned Table 1 was applied on one surface of the thus obtained longitudinally drawn sheet. Meanwhile, the coating solution 1 was prepared by adding the Gemini surfactant in an amount of 0.1 part by weight based on 100 parts by weight of whole components except for the Gemini surfactant in the coating layer and the platinum group metal catalyst in an amount of 100 ppm based on 100 parts by weight of whole components in the coating layer, respectively, thereto 6 hr before applying the coating solution onto the film, and using water as a main solvent. Then, the resulting coated sheet was introduced into a tenter where the sheet was drawn at 110° C. at a draw ratio of 4.3 times in a lateral direction thereof and then subjected to heat-setting treatment at 235° C. Thereafter, the obtained drawn sheet was relaxed by 2% in a lateral direction thereof, thereby obtaining a polyester film having a thickness of 50 μm which was provided on one surface thereof with a coating layer having a thickness of 0.07 μm (after being dried).

As a result of evaluating the thus obtained polyester film, it was confirmed that the film exhibited good releasing property even after being treated with the solvent. The properties of the resulting film are shown in Table 2 below.

Examples 2 to 14

The same procedure as in Example 1 was conducted except that the coating agent composition was changed to those shown in Table 1, thereby obtaining polyester films. Properties of the obtained polyester films were as shown in Table 2, i.e., the polyester films exhibited good releasing property not only in a non-treated state but also after being treated with the solvent.

Comparative Example 1

The same procedure as in Example 1 was conducted except that no coating layer was provided, thereby obtaining a polyester film. As a result of evaluating the resulting laminated polyester film, it was confirmed that properties of the laminated polyester film were as shown in Table 2, i.e., the laminated polyester film exhibited poor releasing property.

Comparative Examples 2 to 4

The same procedure as in Example 1 was conducted except that the coating agent composition was changed to those shown in Table 1, thereby obtaining polyester films. As a result of evaluating the thus obtained laminated polyester films, it was confirmed that properties of the laminated polyester films were as shown in Table 2, i.e., the laminated polyester films exhibited poor releasing property after being treated with the solvent.

TABLE 1

| Coating solutions | Weight percentages of components | | | | | | Ratio (ppm) based on whole components |
|---|---|---|---|---|---|---|---|
| | IA | IB | IC | ID | IIA | IIB | III |
| 1 | 100 | 0 | 0 | 0 | 0.1 | 0 | 100 |
| 2 | 100 | 0 | 0 | 0 | 0.5 | 0 | 100 |
| 3 | 100 | 0 | 0 | 0 | 1.0 | 0 | 100 |
| 4 | 100 | 0 | 0 | 0 | 2.0 | 0 | 100 |
| 5 | 100 | 0 | 0 | 0 | 0.5 | 0 | 50 |
| 6 | 100 | 0 | 0 | 0 | 0.5 | 0 | 70 |
| 7 | 100 | 0 | 0 | 0 | 0.5 | 0 | 170 |
| 8 | 100 | 0 | 0 | 0 | 0 | 0.3 | 100 |
| 9 | 0 | 100 | 0 | 0 | 0.5 | 0 | 100 |
| 10 | 0 | 0 | 100 | 0 | 0.5 | 0 | 100 |
| 11 | 0 | 0 | 0 | 100 | 0.5 | 0 | 100 |
| 12 | 100 | 0 | 0 | 0 | 0 | 0 | 100 |
| 13 | 100 | 0 | 0 | 0 | 0 | 0 | 100 |
| 14 | 100 | 0 | 0 | 0 | 0 | 0 | 100 |

TABLE 2

| Examples and Comparative Examples | Coating solutions | Thickness of coating film (μm) | Peel force (mN/cm) | | |
|---|---|---|---|---|---|
| | | | Non-treated | After being heated | After being treated with solvent |
| Example 1 | 1 | 0.07 | 26 | 30 | 30 |
| Example 2 | 2 | 0.03 | 27 | 28 | 37 |
| Example 3 | 2 | 0.07 | 23 | 27 | 24 |
| Example 4 | 2 | 0.10 | 23 | 29 | 39 |
| Example 5 | 3 | 0.07 | 22 | 26 | 24 |
| Example 6 | 3 | 0.10 | 24 | 29 | 29 |
| Example 7 | 4 | 0.07 | 22 | 29 | 40 |
| Example 8 | 5 | 0.07 | 24 | 25 | 25 |
| Example 9 | 6 | 0.07 | 24 | 28 | 26 |
| Example 10 | 7 | 0.07 | 26 | 34 | 35 |
| Example 11 | 8 | 0.07 | 26 | 31 | 31 |
| Example 12 | 9 | 0.07 | 25 | 29 | 33 |
| Example 13 | 10 | 0.07 | 25 | 30 | 35 |
| Example 14 | 11 | 0.07 | 29 | 27 | 41 |
| Comparative Example 1 | — | — | 5000 | — | 5000 |
| Comparative Example 2 | 12 | 0.02 | 34 | 60 | 80 |
| Comparative Example 3 | 13 | 0.03 | 28 | 30 | 50 |
| Comparative Example 4 | 14 | 0.10 | 22 | 29 | 100 |

INDUSTRIAL APPLICABILITY

The release film of the present invention is a release film that is hardly deteriorated in releasing property owing to a solvent used upon processing an adhesive layer, and can be suitably used, for example, as a release film for adhesives or a protective film for an adhesive layer for a polarizing plate.

The invention claimed is:
1. A release film comprising a polyester film and a coating layer formed on at least one surface of the polyester film, which coating layer is formed by coating a coating solution comprising an addition curing silicone compound, a Gemini surfactant, and a platinum group metal catalyst and curing thereof.

2. A release film according to claim 1, wherein the addition curing silicone compound is a silicone compound comprising an unsaturated hydrocarbon group and a hydrogen group as functional groups in its structure.

3. A release film according to claim 1, wherein the addition curing silicone compound is a mixture comprising a silicone compound comprising an unsaturated hydrocarbon group as functional group in its structure and a silicone compound comprising a hydrogen group as functional group in its structure.

4. A release film according to claim 1, wherein the Gemini surfactant is an ethoxylated product of acetylene glycol.

5. A release film according to claim 1, wherein the coating solution further comprises a polyvinyl alcohol or a polyester resin.

6. A release film comprising a polyester film and a coating layer formed on at least one surface of the polyester film, which coating layer is formed by coating a coating solution comprising an addition curing silicone compound, a Gemini surfactant, and a polyvinyl alcohol and curing thereof.

7. A release film according to claim 6, wherein the addition curing silicone compound is a silicone compound comprising an unsaturated hydrocarbon group and a hydrogen group as functional groups in its structure.

8. A release film according to claim 6, wherein the addition curing silicone compound is a mixture comprising a silicone compound comprising an unsaturated hydrocarbon group as functional group in its structure and a silicone compound comprising a hydrogen group as functional group in its structure.

9. A release film according to claim 6, wherein the Gemini surfactant is an ethoxylated product of acetylene glycol.

10. A release film according to claim 6, wherein the coating solution further comprises a polyester resin.

11. A release film comprising a polyester film and a coating layer formed on at least one surface of the polyester film, which coating layer is formed by coating a coating solution having a concentration of about 0.1 to about 50% by weight in terms of a solid content thereof, and curing thereof,
   which solid content consists of an addition curing silicone compound and a Gemini surfactant.

12. A release film comprising a polyester film and a coating layer formed on at least one surface of the polyester film, which coating layer is formed by coating a coating solution having a concentration of about 0.1 to about 50% by weight in terms of a solid content thereof, and curing thereof,
   which solid content consists of:
   an addition curing silicone compound,
   a Gemini surfactant, and
   at least one selected from the group consisting of a platinum group metal catalyst;
   polymers selected from the group consisting of polyvinyl alcohol, polyester resins, acrylic resins, polyalkylene glycols, methyl cellulose, hydroxy cellulose and starches; a catalyst activity inhibitor; a crosslinking agent; particles; a defoaming agent; a coatability improver; a thickening agent; an organic lubricant; an antistatic agent; an ultraviolet absorber; an antioxidant; a foaming agent; a dye and a pigment.

* * * * *